(12) United States Patent
Hardt et al.

(10) Patent No.: US 9,830,090 B1
(45) Date of Patent: Nov. 28, 2017

(54) METADATA CACHES IN A RELIABLE DISTRIBUTED COMPUTING SYSTEM

(71) Applicant: Scale Computing Inc., Los Altos, CA (US)

(72) Inventors: Nate Hardt, San Carlos, CA (US); Scott Loughmiller, San Francisco, CA (US); Philip White, San Carlos, CA (US)

(73) Assignee: Scale Computing Inc, Indianapolis, IN (US)

( * ) Notice: Subject to any disclaimer, the term of this patent is extended or adjusted under 35 U.S.C. 154(b) by 0 days.

(21) Appl. No.: 14/554,029

(22) Filed: Nov. 25, 2014

(51) Int. Cl.
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
CPC ..... G06F 3/0619; G06F 3/0689; G06F 3/0665
See application file for complete search history.

(56) References Cited

U.S. PATENT DOCUMENTS

| 8,291,180 B2 * | 10/2012 | Austruy | G06F 11/1662 711/162 |
| 2006/0053139 A1 * | 3/2006 | Marzinski | G06F 11/1464 |
| 2006/0242380 A1 * | 10/2006 | Korgaonkar | G06F 3/0608 711/170 |

* cited by examiner

*Primary Examiner* — Eric S Cardwell

(57) ABSTRACT

In a reliable distributed computing system, techniques where user actions or events affecting real system devices (RSD's), or causing the system to make changes to metadata, require fewer accesses to RSD's. When a virtual system device (VSD) is mounted, substantially all the metadata, or at least that associated with data recovery, is read into memory. Changes to that metadata can be made substantially without any metadata accesses to RSD's. No metadata accesses to RSD's are made for read operations, as the RSD would remain unchanged. Metadata is flushed from memory upon write operations. Metadata about data locations can be maintained in memory, so as to be available if any RSD becomes corrupted or otherwise comes to lose data.

7 Claims, 2 Drawing Sheets

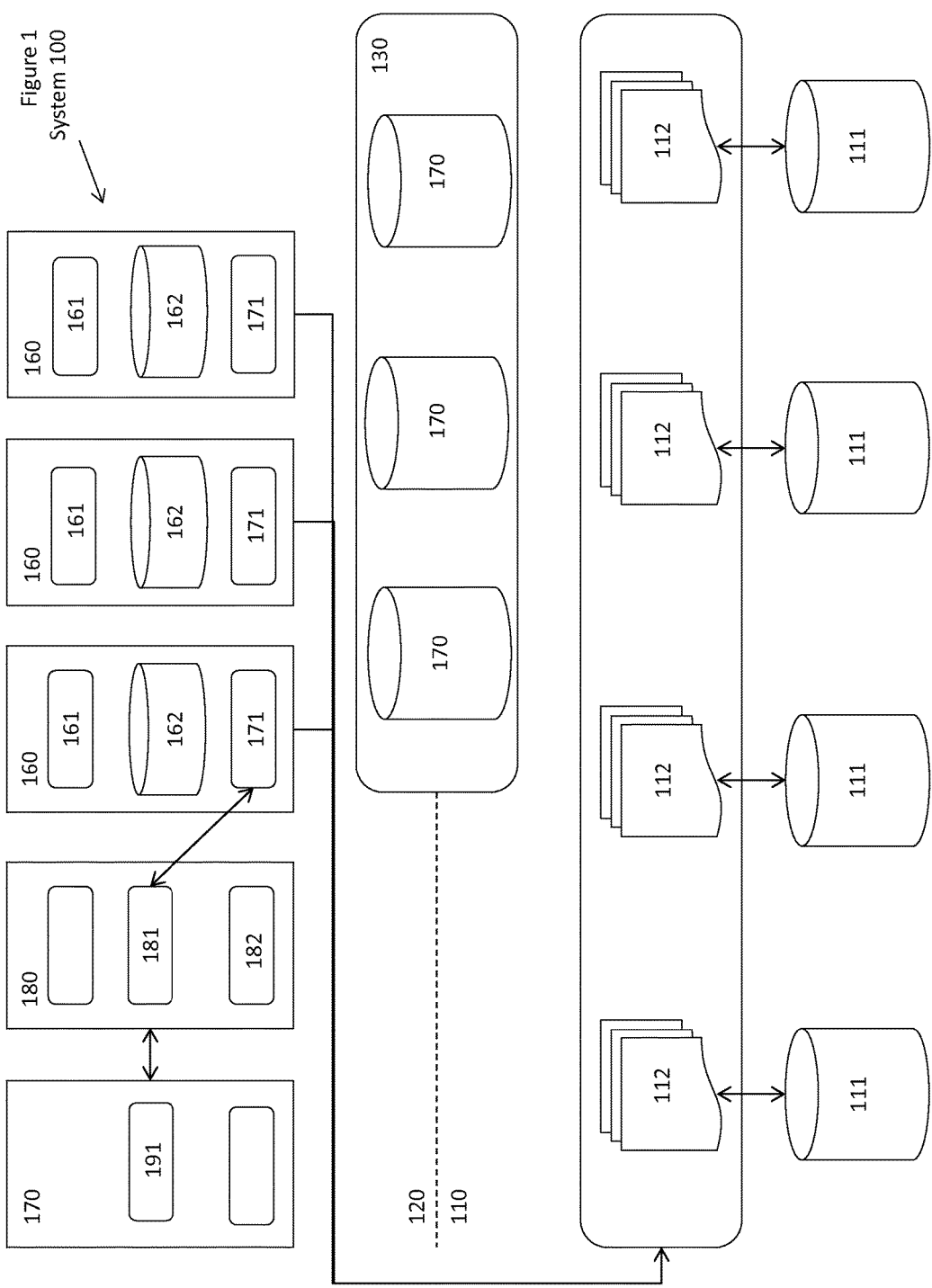

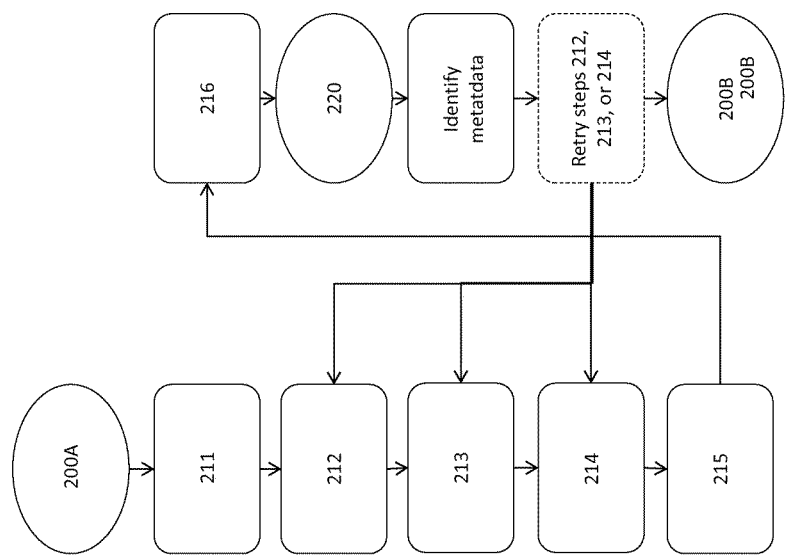

METADATA CACHES IN A RELIABLE DISTRIBUTED COMPUTING SYSTEM

INCORPORATED DISCLOSURES

This Application describes technologies that can be used with inventions, and other technologies, described in one or more of the following Applications, each assigned to the same assignee:

Application 61/909,118, filed Nov. 26, 2013, in the name of Scott Loughmiller and Philip White, titled "Reduplication of de-duplicated files in a fault-tolerant distributed cluster".

Application 61/909,301, filed Nov. 26, 2013, in the name of Aaron Pagel and Nate Hardt, titled "Resource management in a virtual machine cluster".

Application 61/909,336, filed Nov. 26, 2013, in the name of Aaron Pagel and Nate Hardt, titled "Resource management in a virtual machine cluster".

Application 61/909,342, filed Nov. 26, 2013, in the name of Aaron Pagel and Nate Hardt, titled "Resource management in a virtual machine cluster".

Application 61/909,344, filed Nov. 26, 2013, in the name of Nate Hardt, Scott Loughmiller, and Philip White, titled "Unanticipated operational requirements in a reliable distributed computing system".

Application 61/909,365, filed Nov. 26, 2013, in the name of Nate Hardt, Scott Loughmiller, and Philip White, titled "Recovery after data loss in a reliable distributed computing system".

Application 61/909,352, filed Nov. 26, 2013, in the name of Nate Hardt, Scott Loughmiller, and Philip White, titled "Metadata caches in a reliable distributed computing system".

Application 61/909,356, filed Nov. 26, 2013, in the name of Nate Hardt, Scott Loughmiller, and Philip White, titled "Remote access latency in a reliable distributed computing system".

Application 62/080,773, filed Nov. 17, 2014, in the name of Clint McVey and Scott Loughmiller, titled "Zero memory buffer copying in a reliable distributed computing system".

Application 62/080,791, filed Nov. 17, 2014, in the name of Nate Hardt, Scott Loughmiller, and Philip White, titled "Virtual devices in a reliable distributed computing system".

Application No. 62/123,740, filed Nov. 24, 2014, in the name of Scott Loughmiller, Philip White, Aaron Pagel, Nate Hardt, and Clint McVey, titled "Reliable Independent Block Engine and State Machine".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

RELATED APPLICATIONS

This Application describes technologies that can be used with inventions, and other technologies, described in one or more of the following Applications, each assigned to the same assignee:

U.S. Provisional Application 61/651,391, filed May 24, 2012, in the name of inventors Jason Collier, Scott Loughmiller, and Philip White, titled "Unified hypervisor and distributed fault-tolerant storage".

U.S. application Ser. No. 13/901,325, filed May 23, 2013, in the name of inventors Jason Collier, Scott Loughmiller, and Philip White, titled "Unified hypervisor and distributed fault-tolerant storage".

U.S. application Ser. No. 14/229,748, filed Mar. 28, 2014, in the name of inventors Philip White, and Hank Hsien, titled "Placement engine for a block device".

U.S. application Ser. No. 14/318,414, filed Jun. 27, 2014, in the name of inventors Philip White, titled "Shared reference counters among a plurality of virtual storage devices".

U.S. application Ser. No. 14/320,427, filed Jun. 30, 2014, in the name of inventors Philip White, titled "Efficient migration of virtual storage devices to a remote node using snapshots".

Each and every one of these documents, as well as all documents cited therein, are hereby incorporated by reference as if fully recited herein.

This Application claims priority of the Incorporated Documents, and to each and every document cited therein, to the fullest extent possible.

No aspect of incorporating these documents by reference is intended to be limiting in any way. The scope and spirit of the invention remains as broad as possible, given the specification and original claims of this Application. These Incorporated Documents are additive in nature, and can be combined with the technical matter described herein, in whole or in part.

BACKGROUND

Field of the Disclosure

This application generally relates to metadata, caches, reliable computing systems, distributed computing systems, and other matters.

Background of the Disclosure

Some computing systems are capable of emulating selected hardware devices, which might or might not be physically present at the computing system. These systems might include virtual machines (VM's), in which a host operating system (host OS) executes code to control real system devices (RSD's), to emulate virtual system devices (VSD's). The host operating system (host OS) executes code to emulate and control a guest operating system (guest OS), which itself can execute code to present an environment to one or more applications. In such systems, user might affect virtual systern devices (VSD's) by means of instructions from one or more applications or the guest OS.

In such systems, it might sometimes occur that storage devices lose data, with the effect that data important to the user might be lost. While, this problem can be addressed by maintaining metadata to protect against data loss, maintaining the metadata can involve multiple storage access operations to maintain the metadata current, each time a user operation that affects a VSD causes an access to an RSD. For example, it might occur that the computing system maintains a distributed file system, with the idea that a distributed file system might be less subject to failure and more resilient to error. This same approach might apply to other resources made available as VSD's.

In such systems, it might sometimes occur that more than one change to the metadata occurs for each user operation that causes access to one or more RSD's. For example, in a tree-structure storage system such as those used in the linux kernel, each access to a leaf on the tree can cause metadata to be affected at each node of the tree between that leaf and the tree root. Such multiple accesses might involve one or more accesses to RSD's, and might be deprecated.

Each of these issues, as well as other possible considerations, might cause difficulty in aspects of operating computing systems, particularly in those computing systems in which virtual machines are implemented, or in computing systems making use of distributed resources.

BRIEF SUMMARY OF THE DISCLOSURE

This application provides techniques in which user actions or events affecting RSD's, or causing the system to make changes to metadata, require relatively fewer accesses to RSD's to alter that metadata. In one embodiment, when a VSD is made available to a user (the VSD is "mounted"), substantially all the metadata, or at least that associated with data recovery, is read into memory. This has the effect that changes to that metadata can be made substantially without any metadata accesses to RSD's. These techniques make no metadata accesses to RSD's for read operations, as the RSD would remain unchanged. As a write operation would cause the RSD would be changed anyway, substantially all the metadata can be written out at once (that is, the metadata can be "flushed" from memory), avoiding any extra write operations. Metadata about data locations can be maintained in memory, so as to be available if any RSD becomes corrupted or otherwise comes to lose data.

After reading this application, those skilled in the art would recognize that techniques shown in this application are applicable to more than just the specific embodiments shown herein. For example, the concept of metadata is intended to be broad, and can include any information useful to recover to location of lost data, and can include a tree-structure or any other collection of information about disk locations, or can include information having other functions as well, or otherwise.

While multiple embodiments are disclosed, including variations thereof, still other embodiments of the present application will become apparent to those skilled in the art from the following detailed description, which shows and describes illustrative embodiments of the application. The application is capable of modifications in various aspects, all without departing from its scope or spirit. The drawings and detailed description are illustrative in nature and not restrictive.

BRIEF DESCRIPTION OF THE FIGURES

FIG. 1 shows a conceptual drawing of a system.
FIG. 2 shows a conceptual drawing of a method.

DETAILED DESCRIPTION

Terms and Phrases

The following definitions are intended to be exemplary and illustrative, not necessarily limiting:

The phrase "real storage device," the term "RSD," and variants thereof, generally refer to any physical device with which the computer system can communicate.

The phrase "virtual storage device," the term "VSD," and variants thereof, generally refer to any virtual device whose capabilities are emulated by a host operating system or virtual machine.

The term "metadata," and variants thereof, generally refers to any information about the storage of data, including RSD's or VSD's.

FIGURES AND TEXT

FIG. 1 shows a conceptual drawing of a system.
FIG. 2 shows a conceptual drawing of a method.
System Overview
FIG. 1 shows a conceptual drawing of a system.

A system 100 includes elements described herein, other elements shown in the figure, and possibly other elements. In one embodiment, the system 100 includes two or more redundant nodes; however, the figure only shows one of those nodes. This one of multiple nodes is also in communication with those other nodes, with the effect of providing a reliable distributed computer system. As the multiple nodes frequently communicate the content of their memory and storage devices, the system 100 can be considered as if it were a distributed computer system with multiple real storage devices (RSD's) and a shared memory, each accessible to all processors of each individual redundant node. Accordingly, the figure should be considered to represent a distributed computer system with a shared memory and a set of shared RSD's.

Kernel Elements

The system 100 can include a kernel 110, that can include a set of kernel elements, or in addition to or in lieu thereof, a set of elements operating at a kernel level of authorization. The system 100 can also include a userspace 120, that can include a set of user elements, or in addition to or in lieu thereof, a set of elements operating at a user level of authorization (other than the kernel level of authorization).

The kernel no can be managed by a Linux kernel, and can include one or more real storage devices (RSD's) in. While this application primarily describes RSD's 111 as storage devices, it is alternatively possible that they are other types of devices. For a first example, RSD's in could be network interface cards (NIC's), or any other suitable device, coupled to the kernel no using an iSCSI interface. For a second example, RSD's in could be another other device capable of operating as described herein.

As described herein, in one embodiment, RSD's 111 can include disk drives or other mass storage devices, such as SSD drives or otherwise, and can each be associated with a device queue 112. The device queue 112 can include instructions from a user in the userspace 120 (authorized by user access to the kernel, and sanitized by the kernel), and can include data to be written, locations of where to place data to be read, read/write instructions, responses to read/write instructions, and possibly error messages. As further described herein, the RSD's in and the device queues 112 can be managed by an I/O Manager (as further described herein) that provides user access to the kernel through a kernel access port 113.

The system 100 also includes at least some shared memory 110 (optionally, each individual node can include some non-shared memory). The shared memory 110 is shown in the figure as being on the border between kernel-accessible memory 120 and user-accessible memory 130, as the shared memory 110 can be accessed by either user resources or kernel resources. The distinction between user resources and kernel resources is further described herein.

Virtual Machines

The system 100 also can include one or more virtual machines (VM) 160, each including a guest operating system (guest OS) 161 and a host operating system (host OS), the latter including a set of drivers and indicated as Qemu 162. Each of the one or more guest OS's 161 can call on one or more of the drivers associated with its own copy of Qemu 162. Its Qemu 162 can include device drivers for virtual storage devices (VSD's) 170, each of which emulates a real-world storage device, although not necessarily a real-world storage device that is actually manufactured and sold.

While this application primarily describes VSD's 170 as storage devices, it is alternatively possible that they are other types of virtual devices. For a first example, VSD's 170 could be network interface cards (NIC's), or any other suitable device, coupled to its Qemu 162 using an iSCSI interface. For a second example, VSD's 170 could be another other device capable of operating as described herein.

Upon receiving an instruction to read/write, from/to, one or more VSD's 170, its Qemu 162 sends that instruction to a block driver element in the hypervisor that is managing its Qemu 162. That block driver element sends the instruction to a libscribe element 171, that performs the work of reading/writing data from/to the one or more RSD's 111 associated with those one or more VSD's 170. The libscribe element 171 is shown coupled to the RSD's 111 and their device queues 112, but in reality, the libscribe element 171 operates using a scribed daemon 180, and in particular, a libscribe server 181 within that scribed daemon 180.

"Scribed" Server

Accordingly, the libscribe element 171 sends the read/write instruction to the scribed daemon 180, an in particular, to the libscribe server 181 that can be included in the scribed daemon 180. (The scribed daemon 180 can operate using a scaled daemon 190, and in particular, a state machine 191 in the scaled daemon 190.) The libscribe server 181 sends the read/write instructions to an I/O Manager 182, which can be granted authorization to access selected portions of the kernel element 110, such as using a port 183.

The I/O Manager 182, using the port 183, can call upon the kernel element 110 to send the read/write instructions to the RSD's 111 and their device queues 112, where they can be executed and responded to. The I/O Manager 182, using the port 183, can obtain responses to the read/write instructions from the RSD's 111 and their device queues 112. The I/O Manager 182 can return those responses to the libscribe server 181, which can return them to the libscribe element 171, which can return them to the associated Qemu 162, which can return them to the associated goest OS 161.

This has the effect that the guest OS 161, which attempts to issue read/write instructions to a VSD 170, instead has those read/write instructions rewritten and redirected to one or more RSD's 111, upon which the data and metadata for that VSD 170 are stored.

Method of Operation

FIG. 2 shows a conceptual drawing of a method.

A method 200 includes flow points and method steps as described herein. These flow points and method steps are, by the nature of the written word, described in a particular order. This description does not limit the method to this particular order. They might be performed in a different order, or concurrently, or partially concurrently, or otherwise in a parallel, pipelined, quasi-parallel, or other manner. They might be performed in part, paused, and returned to for completion. They might be performed as co-routines or otherwise. In the context of the invention, there is no particular reason for any such limitation.

One or more portions of the method 200 are sometimes described as being performed by particular elements of the system 100 described with respect to FIG. 1, or sometimes by "the method" itself. When a flow point or method step is described as being performed by "the method," it can be performed by one or more of those elements, by one or more portions of those elements, by an element not described with respect to the figure, by a combination or conjunction thereof, or otherwise.

Beginning of Method

A flow point 200A indicates a beginning of the method. A guest OS 161, possibly prompted by an application program, intends to use a particular VSD 170.

Mounting the VSD

At a step 211, an application on the guest OS 161 requests that the VSD 170 be "mounted". This is in the same sense as a Unix or Linux disk mount, that is, the disk is to be made available for use by the application.

At a step 212, the guest OS 161 attempts to mount the VSD 170.

At a step 213, the hypervisor intercepts the request by the guest OS 161 to mount the VSD 170. As part of this step, the hypervisor creates the VSD 170, allocating all or part of one or more RSD's 111 to emulate the VSD 170.

At a step 214, the hypervisor identifies all the metadata on the VSD 170, or at least all the metadata needed to recover the data on the VSD 170 if one or more of the RSD's 111 emulating that VSD 170 become unavailable. In general, the hypervisor only protects against single points of failure, so no more than two RSD's 111 are strictly necessary. In some cases, the hypervisor might be directed to maintain the validity of the VSD's data against two or more failures, or to maintain some other operational constraint, in which case more than two RSD's in might be involved.

As part of this step, the hypervisor identifies the tree-structure of data blocks, on each RSD 111, to be used during operation of the RSD 111. Similarly, as part of this step, the hypervisor identifies those portions of the tree-structure that include metadata from which the VSD 170 can be recovered in the event of a failure, in whole or in part, of the RSD 111.

At a step 215, the hypervisor reads substantially all of the metadata (from which the VSD 170 can be recovered in the event of a failure) into memory.

After reading this application, those skilled in the art will see: When the guest OS 161 reads from the VSD 170, and thus reads from one or more of the RSD's 111 implementing that VSD 170, no change is made to those RSD's 111, so there is no need to alter any of the metadata on that those RSD's 111. When the guest OS 161 writes to the VSD 170, it thus writes to at least one of the RSD's 111 implementing that VSD 170. This has the effect of altering the data, and the metadata identifying that data, on that VSD 170, so the metadata for at least one of those RSD's 111 should be written out to the RSD 111. Thus, the metadata should be written out to the RSD 111 so the RSD 111 remains consistent in the event of the node failing.

Acting on Disk Instructions

At a flow point 220, the method 200 is ready to receive instructions from the guest OS 161.

At a step 231, the method 200 receives a disk instruction from the guest OS 161. As part of this step, the method 200 determines if the instruction is a disk read instruction or a disk write instruction. If the instruction is a disk read instruction, the method 200 proceeds with the flow point 240. If the instruction is a disk write instruction, the method 200 proceeds with the next step (232).

Write Instructions.

At a step 232, the method 200 performs the disk write instruction to the RSD 111, and (preferably with that write and as an atomic operation) flushes its memory of metadata for the RSD 111 being written to. Thus, the method 200 writes to the RSD 111, and writes all the metadata associated with that RSD 111 back to the RSD 111, preferably atomically or in another way that preserves the integrity of the RSD 111 in the event of a node failure.

The method 200 then proceeds with the flow point 220, where it is ready to receive further instructions from the guest OS 161.

Read Instructions.

At a flow point 240, the method 200 performs the disk read instruction from the RSD 111, and proceeds with the flow point 220, where it is ready to receive further instructions from the guest OS 161.

End of Method

The method 200 proceeds until the node fails.

After reading this application, those skilled in the art would see that the method 200 can, upon encountering a disk write instruction, flush its metadata for the entire VSD 170, or alternatively and preferably, flush its metadata only for the RSD's in that are affected by that disk write instruction.

Alternative Embodiments

While some embodiments are generally described herein with respect to host operating systems (host OS's) controlling real system devices (RSD's) and virtual system devices (VSD's), and guest operating systems (guest OS's) having access only to VSD's, in the context of the invention, there is no particular requirement for any such limitation. For example, individual elements or method steps of the described embodiments could be replaced with substitutes that perform similar functions in other contexts. Examples of such contexts can include any system in which information is transferred between processes (or threads) with differing security authorization.

Elements of the system are described herein with respect to one or more possible embodiments, and are not intended to be limiting in any way. In the context of the invention, there is the particular requirement for any such limitations as described with respect to any elements of the system. For example, individual elements of the described apparatuses could be replaced with substitutes that perform similar functions. Moreover, as described herein, many individual elements of the described apparatuses are optional, and are not required for operation.

Although control elements of the one or more described apparatuses are described herein as being executed as if on a single computing device, in the context of the invention, there is no particular requirement for any such limitation. For example, the control elements of the one or more described apparatuses can include more than one computing device, not necessarily all similar, on which the element's functions are performed.

Certain aspects of the embodiments described in the present disclosure may be provided as a computer program product, or software, that may include, for example, a computer-readable storage medium or a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular embodiments. Functionality may be separated or combined in procedures differently in various embodiments of the disclosure or described with different terminology. These and other variations, modifications, additions, and improvements may fall within the scope of the disclosure and the inventive subject matter.

The invention claimed is:

1. A method of accessing metadata with respect to virtual storage devices in a reliable distributed computing system, said system including one or more virtual machines, each said virtual machine emulating a computer system including a processor and memory, and each said virtual machine having access to a plurality of virtual storage devices, each said virtual machine operating under the control of a guest operating system, each said guest operating system operating under control of one or more host operating systems associated with a plurality of said virtual machines, said method including:

by one or more host operating systems, emulating said real storage devices using one or more said virtual storage devices, and maintaining metadata associating one or more said real storage devices with one or more said virtual storage devices;

by one or more said guest operating systems, mounting one or more said virtual storage devices, and performing read and write operations on mounted ones of said virtual storage devices;

in response to said mounting, reading substantially all of said metadata associated with data recovery into a memory;

in response to said performing read and write operations on mounted virtual storage devices, determining whether those operations include read operations or write operations;

when said operations include reading from said virtual storage devices, reading said metadata from memory without accessing metadata maintained on any real storage devices;

when said operations include writing to said virtual storage devices, writing any changes to said metadata into memory, and atomically writing all pending changes to said metadata, associated with all said mounted virtual storage devices, from memory onto one or more real storage devices.

2. A method as in claim 1, wherein said mounting one or more virtual storage devices includes:

intercepting a request by a guest operating system to mount a particular virtual storage device;

making an association between one or more real storage devices and said virtual storage device;

providing metadata in memory to maintain said association; and identifying at least a portion of said metadata to recover data for said virtual storage device in the event of loss of data.

3. A method as in claim 2, wherein
said identifying includes:
for each real storage device associated with said particular virtual storage device, identifying a tree-structure of file system units maintained by said each real storage device and needed to recover data for said virtual storage device in the event of loss of data.

4. A method of accessing metadata with respect to virtual storage devices in a reliable distributed computing system, said system including one or more virtual machines, each said virtual machine emulating a computer system including a processor and memory, and having access to a plurality of virtual storage devices, each said virtual machine operating under the control of a guest operating system, each said guest operating system operating under control of one or more host operating systems associated with a plurality of said virtual machines, said method including:
by one or more host operating systems, emulating said real storage devices using one or more said virtual storage devices, and maintaining metadata associating one or more said real storage devices with one or more said virtual storage devices;
by one or more said guest operating systems, mounting one or more said virtual storage devices, and performing read and write operations on mounted ones of said virtual storage devices;
in response to said mounting, reading substantially all said metadata associated with data recovery into a memory;
in response to said performing read and write operations on mounted virtual storage devices, determining whether those operations include read operations or write operations;
when said operations include reading from said virtual storage devices, reading said metadata from memory without accessing metadata maintained on any real storage devices;
when said operations include writing to said virtual storage devices, writing any changes to said metadata into memory, and atomically writing all pending changes to said metadata, associated with all said mounted virtual storage devices, from memory onto one or more real storage devices.

5. A method as in claim 4, wherein
each said virtual machine includes a file system responsive to one or more said virtual storage devices,
said file system including a tree structure including a root node and one or more leaf nodes located below said root node in said tree structure,
said tree structure including metadata for each leaf node in one or more nodes thereabove,
said tree structure including metadata for each node above one or more leaf nodes and below said root node in one or more nodes thereabove.

6. A method as in claim 5, wherein
in response to writing to each said file system, said metadata for one or more nodes written to is modified,
whereby writing to one or more nodes in any one or more said file system causes metadata for one or more nodes thereabove is modified.

7. A method of accessing metadata with respect to virtual devices in a reliable distributed computing system, each virtual device representing at least portions of one or more real devices, the method including
maintaining metadata associating at least portions of the real devices with at least portions of the virtual devices, the metadata including one or more leaf nodes associating real data blocks of the real devices with virtual data blocks of the virtual devices, the metadata including one or more non-leaf nodes associating metadata for the real devices with metadata for the virtual devices;
mounting one or more of the virtual devices, and in response thereto, reading substantially all of the metadata associated with data recovery into a memory;
performing read and write operations on the portions of the virtual devices; when those operations include reading from the virtual devices, reading metadata associating those virtual devices with one or more real devices, from memory without reading from any real devices; and when those operations include writing to the virtual devices, atomically writing all pending changes to the metadata associated with all mounted virtual devices from memory onto one or more real devices.

* * * * *